(12) United States Patent
Goncharova et al.

(10) Patent No.: US 12,220,876 B2
(45) Date of Patent: Feb. 11, 2025

(54) METHOD FOR SURFACE STRUCTURING

(71) Applicants: Airbus Operations GmbH, Hamburg (DE); Airbus Operations SAS, Toulouse (FR)

(72) Inventors: Galyna Goncharova, Toulouse (FR); Alexei Vichniakov, Hamburg (DE)

(73) Assignees: Airbus Operations GmbH, Hamburg (DE); Airbus Operations SAS, Toulouse (FR)

( * ) Notice: Subject to any disclaimer, the term of this patent is extended or adjusted under 35 U.S.C. 154(b) by 127 days.

(21) Appl. No.: 18/158,555

(22) Filed: Jan. 24, 2023

(65) Prior Publication Data

US 2023/0234301 A1    Jul. 27, 2023

(30) Foreign Application Priority Data

Jan. 26, 2022   (EP) .................................... 22153504

(51) Int. Cl.
*B29C 65/00* (2006.01)
*B29K 105/00* (2006.01)
(Continued)

(52) U.S. Cl.
CPC .......... *B29C 66/022* (2013.01); *B29C 66/721* (2013.01); *B29C 66/723* (2013.01);
(Continued)

(58) Field of Classification Search
CPC ... B29C 66/022; B29C 66/721; B29C 66/723; B29C 66/729; B29C 66/7292;
(Continued)

(56) References Cited

U.S. PATENT DOCUMENTS

| 4,618,516 A | 10/1986 | Sager |
| 2017/0190165 A1 | 7/2017 | Macadams et al. |

(Continued)

FOREIGN PATENT DOCUMENTS

| EP | 3036049 B1 | 5/2019 |
| EP | 3603940 A1 | 2/2020 |
| JP | 2012115989 A | * 6/2012 |

OTHER PUBLICATIONS

Machine English translation of JP2012115989, Accessed Jul. 10, 24 (Year: 2012).*

(Continued)

*Primary Examiner* — Jacob T Minskey
*Assistant Examiner* — Adrianna N Konves
(74) *Attorney, Agent, or Firm* — Greer, Burns & Crain, Ltd.

(57) ABSTRACT

A method for producing a component with a surface that is suitable for plastic welding or adhesive bonding of two parts is provided. As a preparation step prior to joining, a filler sheet comprising a thermoplastic material or adhesive is arranged on a first surface of a first component and a structuring tool is arranged on the filler sheet. Mechanical force is applied to the structuring tool and heat is applied to the filler sheet such that the filler sheet is attached to the first surface of the first component and such that the structuring tool is partially embedded in the filler sheet. The structuring tool is subsequently removed from the filler sheet to produce a plurality of protrusions in the outer surface of the filler sheet. After surface structuring the first and second components are joined using any type of welding technique or joined using of adhesive bonding.

19 Claims, 4 Drawing Sheets

(51) Int. Cl.
*B29K 105/16* (2006.01)
*B29L 31/30* (2006.01)

(52) U.S. Cl.
CPC .. *B29K 2105/0097* (2013.01); *B29K 2105/16* (2013.01); *B29L 2031/3082* (2013.01)

(58) Field of Classification Search
CPC ......... B29C 66/72941; B29C 66/73115; B29C 65/5014; B29C 66/7212; B29C 66/72141; B29C 66/72143; B29C 65/7841; B29C 66/0222; B29C 66/0242; B29C 66/30221; B29C 66/341; B29C 66/71; B29C 65/08; B29C 65/5028; B29C 65/4815; B29C 65/5057; B29C 66/1122; B29C 66/43; B29C 66/73921; B29C 66/73941; B29C 66/8242; B29C 66/8322; B29C 66/3464; B29C 66/929; B29C 66/45; B29C 66/472; B29C 66/52272; B29C 65/04; B29C 65/5035; B29C 65/1412; B29C 65/16; B29K 2105/0097; B29K 2105/16; B29L 2031/3082; B29L 2031/30; B29L 2031/3076; B29L 2031/3088; B29L 2031/3097

See application file for complete search history.

(56) References Cited

U.S. PATENT DOCUMENTS

2017/0282496 A1\* 10/2017 Cott .......................... B32B 1/00
2020/0031059 A1 1/2020 Yoshida et al.
2022/0072805 A1\* 3/2022 Stöven ............. B29C 66/30221

OTHER PUBLICATIONS

European Search Report dated Jul. 18, 2022; priority document.
Irene Fernandez Villegas, et al., "Process and Performance Evaluation of Ultrasonic, Induction and Resistance Welding of Advanced Thermoplastic Composites" Journal of Thermoplastic Composite Materials, Delft University of Technology, Delft, The Netherlands; 18 pages.
Andreas Gomer et al., "Gefugige Kunststoffe" 3 pages.

\* cited by examiner

METHOD FOR SURFACE STRUCTURING

CROSS-REFERENCES TO RELATED APPLICATIONS

This application claims the benefit of the European patent application No. 22153504.0 filed on Jan. 26, 2022, the entire disclosures of which are incorporated herein by way of reference.

FIELD OF THE INVENTION

The invention relates to a method for producing a part with a surface that is suitable for plastic welding or adhesive bonding. The method may be used to manufacture an assembly of two or more parts which are joined together, for example by ultrasonic welding or adhesive bonding. This method may be applied to a stiffening element such as a stringer, shell or clip of an aircraft fuselage.

BACKGROUND OF THE INVENTION

Welding describes a process in which two or more parts are joined by melting the base material of the parts and causing fusion of the base material between the parts. Energy can be supplied to the interface region between the parts in order to melt the base material in the vicinity of the interface region using various methods. For example, energy in the form of ultrasonic waves is used for ultrasonic welding and a laser for laser welding.

Ultrasonic welding can be used to weld thermoplastic components including composites. U.S. Pat. No. 4,618,516 discloses a method of joining two thermoplastic components by ultrasonic energy along respective confronting surfaces in which one component surface is provided with an energy director and the other surface is provided with a rough textured surface. A compressive force between the workpieces is applied and then ultrasonic energy is applied to the workpieces by means of an ultrasonic horn, also known as a sonotrode. The dissipation of ultrasonic energy in the thermoplastic components creates molten thermoplastic material at the interface between the workpieces. After a predetermined time interval, the ultrasonic energy is removed which causes the molten thermoplastic material to solidify and thereby provide a fusion joint between the workpieces.

The energy director is used to concentrate the energy in the welding area and lead to reduction of the amount of energy required to soften and melt the thermoplastic material and to increase the strength of the joint or weld. In U.S. Pat. No. 4,618,516, the energy director is formed by projections, for example pyramids, or ridges which are formed in the base material of one of the workpieces and project from the surface of one workpiece and contact the rough surface of the other component.

An object is, therefore, to enable improvements to methods for joining two or more components by welding and to advance the welding quality and reliability.

SUMMARY OF THE INVENTION

According to the invention, a method is provided for producing a part with a surface that is suitable for joining two or more parts, for example for joining by plastic welding, ultrasonic welding or adhesive bonding. The method comprises providing a first component comprising a first surface, arranging a filler sheet comprising a plastic material on the first surface and arranging a structuring tool on the filler sheet. Mechanical force is applied to the structuring tool and heat is applied to the filler sheet such that the filler sheet is attached to the first surface of the first component and such that the structuring tool is partially embedded in the filler sheet. The structuring tool is removed from the filler sheet and produces in the filler sheet an outer surface comprising a plurality of protrusions.

The method may be used to provide surface structuring and used as preparation step prior to joining the component with the outer surface having the plurality of protrusions to one or more further components or parts.

After surface structuring the first and second components are joined using ultrasonic welding, or infrared welding, or induction welding, or laser beam welding, or conductive welding and co-consolidation, or any other welding techniques or joined using adhesive bonding.

The mechanical force applied to the structuring tool provides a compressive force between the structuring tool and the first surface such that the structuring tool is urged into the filler sheet and becomes partially embedded in the filler sheet as the thermoplastic material of the filler sheet melts upon the application of heat. Subsequently, the heat and mechanical force are removed, allowing the thermoplastic filler sheet to cool down and resolidify. Afterwards, the structuring tool is removed from the solid filler sheet that is attached to the first component to produce the plurality of protrusions in the outer surface of the remainder of the filler sheet that is attached to the first surface of the first component.

The first component is provided with a surface structuring, suitable for ultrasonic welding, since the protrusions formed in the outer surface of the filler sheet provide energy directors during the subsequent welding of the component to another component. The energy directors are formed in the surface of the filler sheet rather than being formed directly in the body or base material of the first component. This simplifies the manufacture of the components to be joined and also enables the method to be used for joining components formed from a larger range of materials and also for joining components of differing materials. The use of the additional filler sheet also enables the welding quality to be improved, since dimensional variations or gaps in formed at the interface between the two components can be compensated by the molten material of the filler sheet.

In an embodiment, the method further comprises arranging a second component on the plurality of protrusions and joining the first and second components by welding to form an assembly. In the assembly the first and second component are joined by a welding technology. Typically, compressive force is applied between the first and second component such that the surface of the second component is in contact with the protrusions formed in the outer surface of the filler sheet which has already been joined to the first component. For example, the first and second component may be clamped to one another. As discussed above, welding is a process in which energy is applied to the components which causes the material of the first and second components to melt, at least in regions immediately adjacent to the joining interface. This causes fusion of the base material between the first and second components. The energy is then removed so that the components cool down, the molten material solidifies and a welded joint is formed between the first and second components. The invention, therefore, also provides a method of welding.

In an example, the welding process is ultrasonic welding. For example, ultrasonic waves having a frequency in the range of 16 kHz to 60 kHz and with an amplitude in the range of 10 µm to 200 µm are supplied to the components and the filler sheet by a sonotrode for a pre-determined time interval, for example for a few seconds during which the filler sheet and adjacent regions of the first and second components melt causing fusing of the base material. The sonotrode is then switched off, allowing the components and the joint formed by the fusing of the base material of the first and second components to cool down and solidify, thus creating a welded joint between the first and second component.

Ultrasonic welding of thermoplastic polymers, either in a pure condition or filled with the fiber reinforcement, is based on the principle that the kinetic energy of an acoustic wave of ultrasonic frequency propagating inside apart will partly dissipate as heat energy when this wave crosses the interface into an adjacent part. This heat will melt the thermoplastic polymer in regions close to the interface, causing the macromolecular diffusion of the matrix, that is the thermoplastic material, from both components to form a welded joint between the components after cooling down. The energy directors provided by the protrusion in the filler sheet serve to localize heat generation at the interface. The welding process may be carried out statically or continuously.

The methods described herein may also be used to join more than two components to form the assembly. Welding is a local joining method so that in embodiments in which the assembly includes more than two components, each welded joint is formed sequentially, for example by repeating the method or repeating the welding process.

However, the welding process is not limited to ultrasonic welding and other types of welding process may be used, such as infrared welding, induction welding, laser beam welding or a conductive welding and co-consolidation process. The type of welding process may be selected depending on the material of the filler sheet and base materials of the components to be joined.

Also, this method could be applied for producing a part with a structured surface having a plurality of protrusions for use in adhesive bonding processes. An adhesive layer could be produced and structured on the surface of one or both joined parts by this method. The invention is not limited to joining of thermoplastic materials but may be applied to all kinds of plastics and metallic ones. The applied layer should be capable for plastic forming and joining with main joined parts.

In some embodiments, the filler sheet comprises a thermoplastic material. The thermoplastic material of the filler sheet may have a melting temperature of at least 120° C. The filler sheet may be free of fibers or other filling materials and may consist of thermoplastic material only. Alternatively, the filler sheet may include a filler such as fibers in addition to the thermoplastic material. The fibers may be carbon fibers, glass fibers, ceramic or metallic fibers. Continuous, long or short fibers may be used. The filler sheet may comprise various types of thermoplastic material, including LM PAEK (polyaryletherketones), PEKK (polyetherketoneketone), PEEK (polyetheretherketone), PEI (polyetherimide), PA (polyamide), PPS (polyphenylene sulfide), PB (polybutenes), PBC (polyester block copolymers), PV (polyvinyls) and PC (polycarbonates). Also, different kinds of adhesive materials could be used as filler material, for example a thermosetting resin such as an epoxy resin.

In some embodiments, the filler sheet is a planar continuous sheet. In some embodiments, the filler sheet comprises holes or perforations. In some embodiments, the filler sheet is structurally integral and self-supporting and formed ex-situ. This type of sheet is easy to handle. In some embodiments, the material of the filler is applied to the area to be joined, for example in a liquid form and the sheet is formed in-situ on the first surface of the component.

In some embodiments, the first component and/or the second component comprises a plastic material such as a thermoplastic or a thermoset material. In some embodiments, the first component and/or the second component comprises a metal or an alloy. The first component and/or the second component may comprise unreinforced and reinforced plastic or metallic material. In some embodiments, the first component and/or the second component comprise a composite material. The composite material may comprise a reinforced material, such as fibers or particles and a matrix formed by the thermoplastic material. For example, the composite may be a fiber reinforced composite material in which the thermoplastic provides the matrix. The fibers may be graphite, graphene, carbon fibers, glass or ceramic fibers or particles. Also, biological source fibers could be applied. Continuous, long or short fibers may be used. In some embodiments, the first and/or second component may be a laminate material. Also, fiber or particles after recycling, downcycling or re-use could be applied.

The thermoplastic material of the first component and/or the second component may have a melting temperature of at least 120° C. The thermoplastic material of the first component and/or second component may be LM PAEK, PEKK, PEEK, PEI, PA, PPS, PB, PBC, PV and PC. Thermoset materials could be applied with epoxy matrix. Also, other matrix materials are suitable, like bio-sourced matrix.

In some embodiments, the filler sheet comprises the same thermoplastic material as the first component and/or the second component. This is useful as the thermoplastic material of the filler sheet and first component and/or second component melts as the same temperature and enables good macromolecular diffusion between the filler sheet and first component and/or second component. This is useful for providing a high weld quality since fusion is promoted.

In some embodiments, one or both of the first and second components may be formed of a material other than a thermoplastic. For example, one or both of the first and second components may comprise a thermosetting material or may be formed of an alloy or a metal or may be comprise a laminated material comprising metallic and non-metallic layers. For example, the laminated material may be a fiber metal laminate, such as Glass laminate aluminum reinforced epoxy (GLARE).

The filler sheet and/or structuring tool may be applied locally to a joining area or welding region of the first surface of the first component. Therefore, the protrusions are only formed on the region of the first component which is to be joined to the second component. The remainder of the first surface outside of the joining area remains free of the filler sheet and structuring part.

The structuring tool may have dimensions such that after removal of the structuring tool from the filler sheet, the protrusions formed in the outer surface have dimensions in the submillimeter range, i.e., dimensions that are less than 2 mm, preferably less than 1 mm. For example, the protrusions may have dimensions substantially parallel or substantially perpendicular to the first surface that are less than 2 mm, preferably less than 1 mm. The spacing between the protrusions, i.e., the dimension of the indentations formed between the protrusions, may also be in the submillimeter range. The dimensions of the protrusions and spacing between them may be selected depending on the wavelength used in ultrasonic welding, for example.

In order to attach the filler sheet to the first surface of the first component, heat is applied. The heat may be applied to the filler sheet using an external heat or energy source. For example, an external infrared source for infrared heating, a halogen lamp, conductive heating, induction heating and/or laser heating. This heating may also be locally applied to the first component, for example locally applied to the region which is to be joined to another component such that regions outside of the joining area are not directly subjected to heat. The area of the first component that is subjected to heat may be limited to substantially the lateral extent of the filler sheet. This may be useful in avoiding melting of the component outside of the weld region which may lead to distortion, and avoiding an undesired change in the dimensions or properties of the component.

In some embodiments, the structuring tool comprises a metallic part, e.g., a metallic mesh, such as steel mesh, titanium mesh, copper mesh, magnesium mesh, or peel ply. The mesh may be formed by a woven mesh, a waved mesh, expanded mesh, cutter mesh or stamped mesh. In some embodiments, the structuring tool comprises a metallic textile, or a glass-fiber textile or a ceramic fiber textile. The structuring tool may also include a coating which serves to enable the structuring tool to be more easily removed, i.e., with the use of less force, from the filler sheet.

In one embodiment, a steel mesh is used in combination with a PEKK thermoplastic material for the filler sheet and a halogen lamp is used for heating the filler sheet. The first and second part comprise a fiber reinforced thermoplastic composite, such as a carbon fiber reinforced thermoplastic composite.

The component and the assembly of the component to one or more further components may be a part of an aircraft, for example a structural part of an aircraft or aircraft fuselage such as a stiffening element such as a stringer, shell or clip.

In some embodiments, the component and the assembly of the component to one or more further components may be a part of a drone or a helicopter or a rocket, or a satellite or an automotive vehicle, such as a passenger vehicle or a goods vehicle.

BRIEF DESCRIPTION OF THE DRAWINGS

Embodiments of the invention are described in more detail with reference to the accompanying schematic drawings that are listed below

DETAILED DESCRIPTION OF THE PREFERRED EMBODIMENTS

A method for fabricating a component with a surface suitable for ultrasonic welding will now be described with reference to FIGS. 1 to 5.

Figure 1:
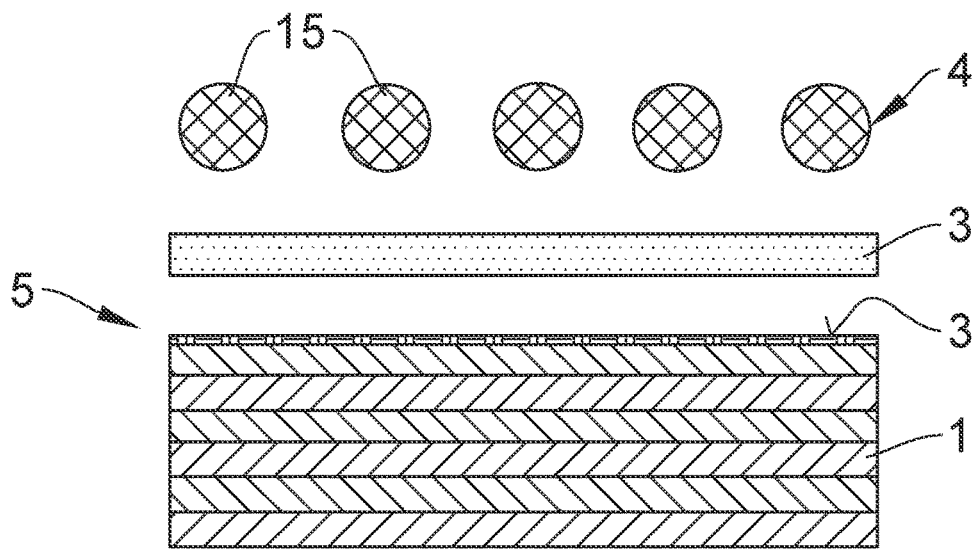
FIG. 1 illustrates the application of a filler sheet and structuring tool to a component.

FIG. 1 illustrates a schematic view of a component 1 having a first surface 2. In FIGS. 1 to 5, a view of the portion of the first surface 2 which is to be joined to a further component is illustrated, i.e., the joining area or welding region 5 of the component 1 is shown. A filler sheet 3 comprising a thermoplastic material is arranged on the first surface 2 of the component 1 and a structuring tool 4 is arranged on the filler sheet 3.

The component 1 comprises a fiber reinforced composite material in which the matrix comprises a thermoplastic material. In other embodiments, the first component may be formed of thermoplastic material without reinforcement or may comprise a composite material having particle or filament reinforcement. The thermoplastic may be PEKK, for example and the fibers may be carbon fibers.

The filler sheet 3 may comprise a planar sheet of thermoplastic material or may include one or more perforations. In some embodiments, two or more filler sheets may be stacked onto the first surface 2 of the component 1 and the structuring tool 4 placed onto the outermost layer. The thermoplastic material of the filler sheet 3 as well as of the first component may have a melting temperature of at least 120° C. The thermoplastic material of the filler sheet 3 and component 1 may be the same, for example PEKK. The filler sheet 3 may be free of fibers or other filling materials and may consist of thermoplastic material only. Alternatively, the filler sheet 3 may include a filler such as fibers in addition to the thermoplastic material. The fibers may be carbon fibers, glass fibers or ceramic fibers. Continuous, long or short fibers may be used.

The structuring tool 4 is formed of a material that has a greater thermal stability than the melting point of the thermoplastic material of the filler sheet 3. The structuring tool 4 may comprise a metallic mesh, for example a steel mesh, so that in the cross-sectional view of FIGS. 1 to 5, the cross-section of a plurality of substantially circular filaments 15 of the mesh can be seen. The mesh may be steel mesh and may be fabricated using various methods, e.g., weaving, stamping or cutting. In other embodiments, the filaments of the mesh do not have a circular cross-section but may be square, rectangular, hexagonal or elliptical, for example. In some embodiments, the structuring tool 4 is formed of woven fibers, for example glass fibers, or ceramic fibers.

The structuring tool 4 is advantageously formed of a material which is not easily welded to the component 1 or filler sheet 3 so as to enable it to be removed. This may be achieved by the architecture of the structuring tool 4 and/or by low adherent properties, that is repellent properties of the structuring tool 4, which allow removal of the structuring tool 4 with the use of low forces, for example by peeling, and preferably with no damage to the component 1 which is to be joined.

Figure 2:
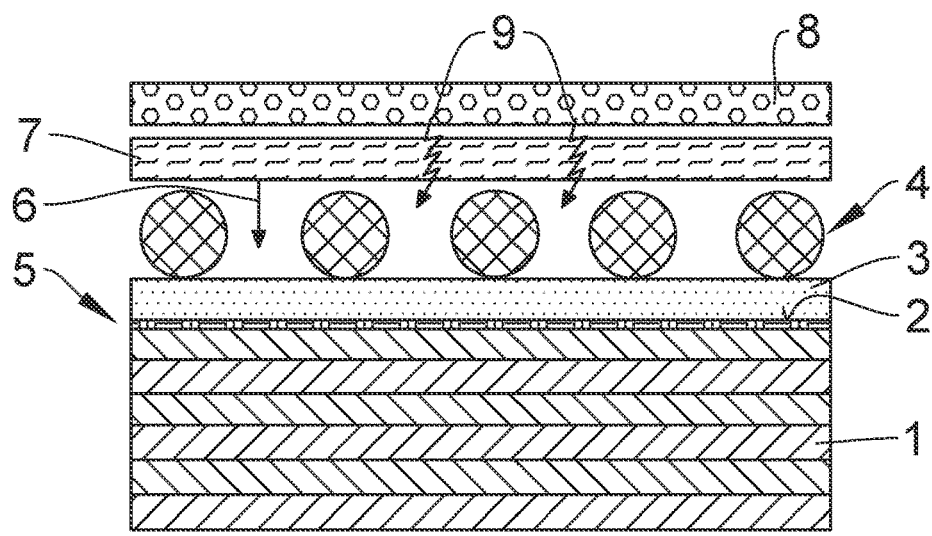
FIG. 2 illustrates the application of a pressure plate and heat source.
Figure 3:
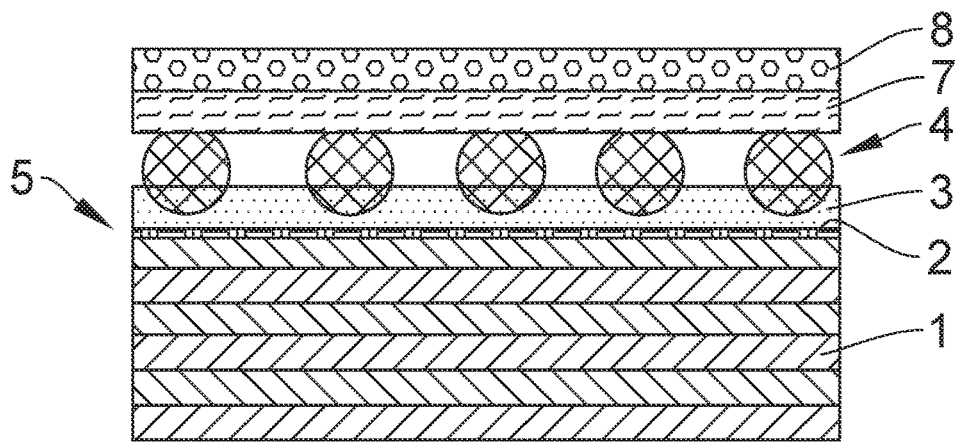
FIG. 3 illustrates partially embedding the structuring tool in the filler sheet.
Figure 4:
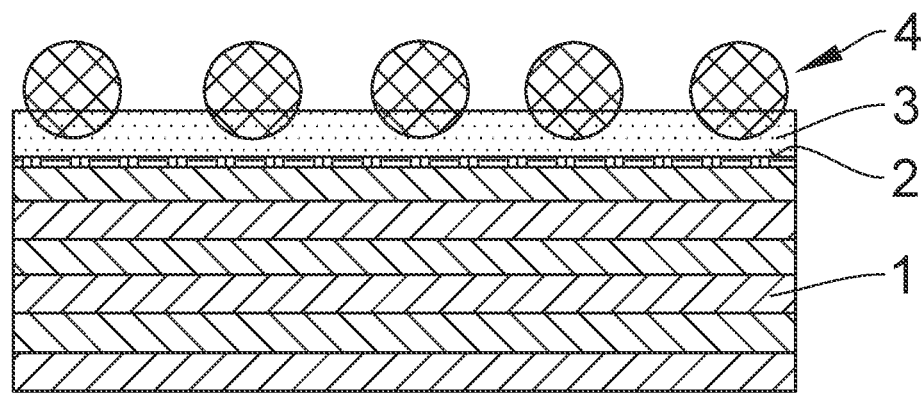
FIG. 4 illustrates the component after the removal of the pressure plate and heat source.

Referring to FIG. 2, mechanical force is applied to the structuring tool 4 as is indicated schematically by the arrow 6 such that there is a compressive force between the structuring tool 4 and the component 1. A plate 7 may be positioned on the structuring tool 4 on the opposing side to the filler sheet 3 and used to apply mechanical pressure to the structuring tool 4. Energy is applied from an external heat source 8, as is schematically illustrated in FIG. 2 by the arrows 9, to the filler sheet 3 such that the filler sheet 3, softens or melts and allows it to be attached to the first surface 2 of the component 1 and such that the structuring tool 4 is pushed into and is partially embedded in the filler is sheet 3, as is illustrated in FIG. 3. For example, a halogen lamp may be used as the external heat source 8. A halogen lamp is useful in embodiments in which PEKK is used as the thermoplastic of the filler sheet 3 and first component 1, The heat and mechanical force are then removed, as is illustrated in FIG. 4, allowing the thermoplastic material of the filler sheet 3 to solidify. The filler sheet 3 is now attached to the first surface 2 of the component 1 and may be welded to the first surface 2 depending on the materials of the filler sheet 3 and the first surface 2 and the heat applied. A portion of the structuring tool 4 remains embedded in the filler sheet 3 and a portion protrudes from the filler sheet 3.

Figure 5:
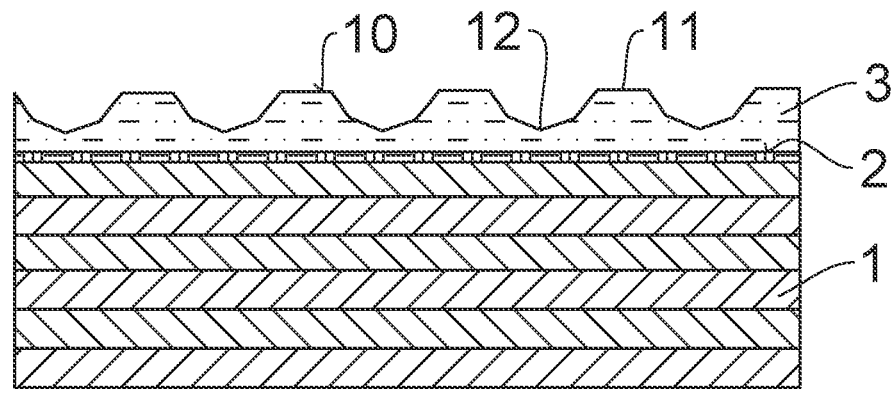
FIG. 5 illustrates the component after removal of the structuring part.

The structuring tool 4 is then removed from the arrangement, as is illustrated in FIG. 5. After the removal of the structuring tool 4, the filler sheet 3 has an outer surface 10 with a surface profile which comprises a plurality of protrusions 11 separated by indentations 12. The dimensions of the protrusions 11 and/or the indentations 12 may be in the submillimeter range. The protrusions 11 can have dimensions and the submillimeter range, for example, dimensions which are smaller than 1 mm, for example less than 0.9 mm or less than 0.7 mm or less than 0.5 mm. These dimensions may lie in one or two dimensions, for example parallel to the first surface 2 and perpendicular to the first surface 2. The protrusions 11 may be spaced apart from one another by less than 1 mm, for example less than 0.9 mm or less than 0.7 mm or less than 0.5 mm.

As the structuring tool 4 is removed, cracks may be formed at the interface between the filler sheet 3 and the structuring tool 4 or within the filler sheet 3 so that the surface profile of the outer surface 10 does not necessarily correspond exactly to the contour of the structuring tool 4 which was embedded in the filler sheet 3. The outer surface 10 may have a more angular and irregular form with the protrusion 11 having sharper tips or peaks. The protrusions 11 may have tips which may have the form of a pyramid or an elongate edge. The protrusions 11 formed in the filler sheet 3 provide energy directors in a subsequent welding process, as is described with reference to FIGS. 6 and 7. For ultrasonic welding, protrusions 11 having a sharp tip are particularly suitable for use as energy directors.

By structuring the filler sheet 3, an energy director is manufactured directly on one of the components to be welded prior to welding. A surface structuring process is used in which a surface profile is formed on an additional polymer part, i.e., the structured filler sheet 3, which may have or be without fiber reinforcement. This surface structuring process serves to prepare and condition the joining surface 5 for welding the surface 5 to another part, for example by the means of ultrasonic waves and ultrasonic welding.

The filler sheet 3 may be formed of the same polymer, i.e., thermoplastic material, as the is one or both of the components to be joined or in the case of a composite material, the same composition as the thermoplastic portion, typically matrix, of the composite component. The structured surface profile 10 including a plurality of protrusions 11 provides an array of energy directors which acts as a processing aid in ultrasonic welding. The filler sheet 3 is applied after part consolidation prior to welding only at the surface 2 of the component that should be welded.

The filler sheet 3 may be applied to the surface 2 by local welding, for example infrared welding, induction welding or conduction welding, and afterwards, the structuring tool 4 is removed to give the surface profile 10 which has a structure submillimeter scale. In some embodiments, the surface profile 10 may have a pyramid or crenellated shape. The use of the structuring tool 4 to form the energy directors has the advantages of improved process capability of reliability of the welding resulting from the size, shape and distribution of the energy directors and also economic advantages resulting from easy handling.

A method of welding using the component 1 with the structured filler sheet 3 and its plurality of protrusions 11 will now be described with reference to FIGS. 6 and 7.

Figure 6:
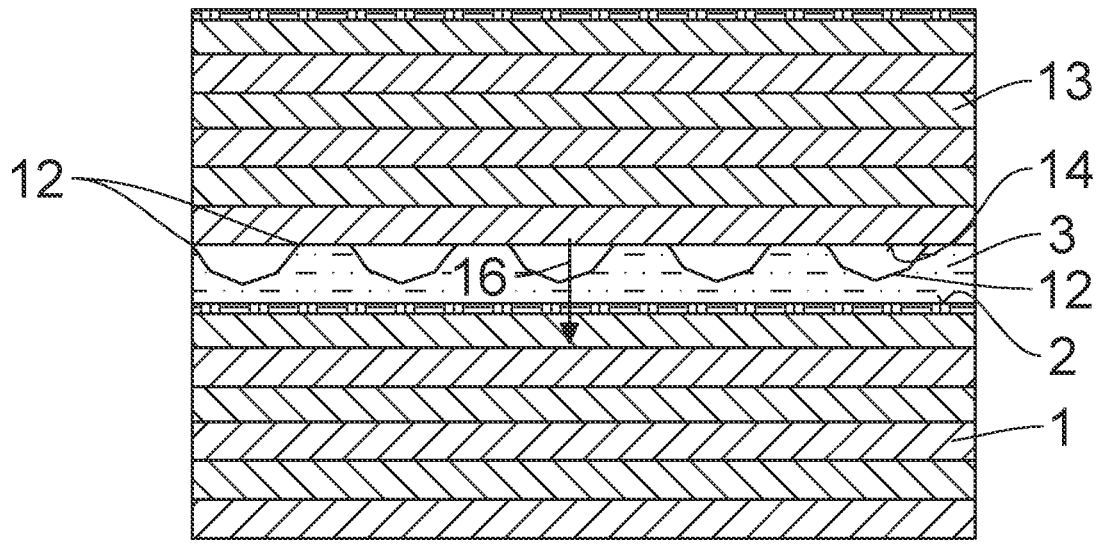
FIG. 6 illustrates an enlarged view of the welding region between two components.

FIG. 6 illustrates a schematic view of the use of the component 1 with a structured filler material layer 10 arranged at the joint area 5 of the component 1 in a welding process to form an assembly. A surface 14 of a further component 13 is positioned on the plurality of protrusions 11 of the filler sheet 3 and the components 1, 13 are joined to one another by welding as is illustrated schematically in FIG. 6 by the arrow 16.

The additional filler material provided by the filler sheet 3 may be used to compensate for tolerances during the welding process as well as to increase the performance of the welding joints by enriching the joining area with matrix materials of the components 1, 13.

Figure 7:
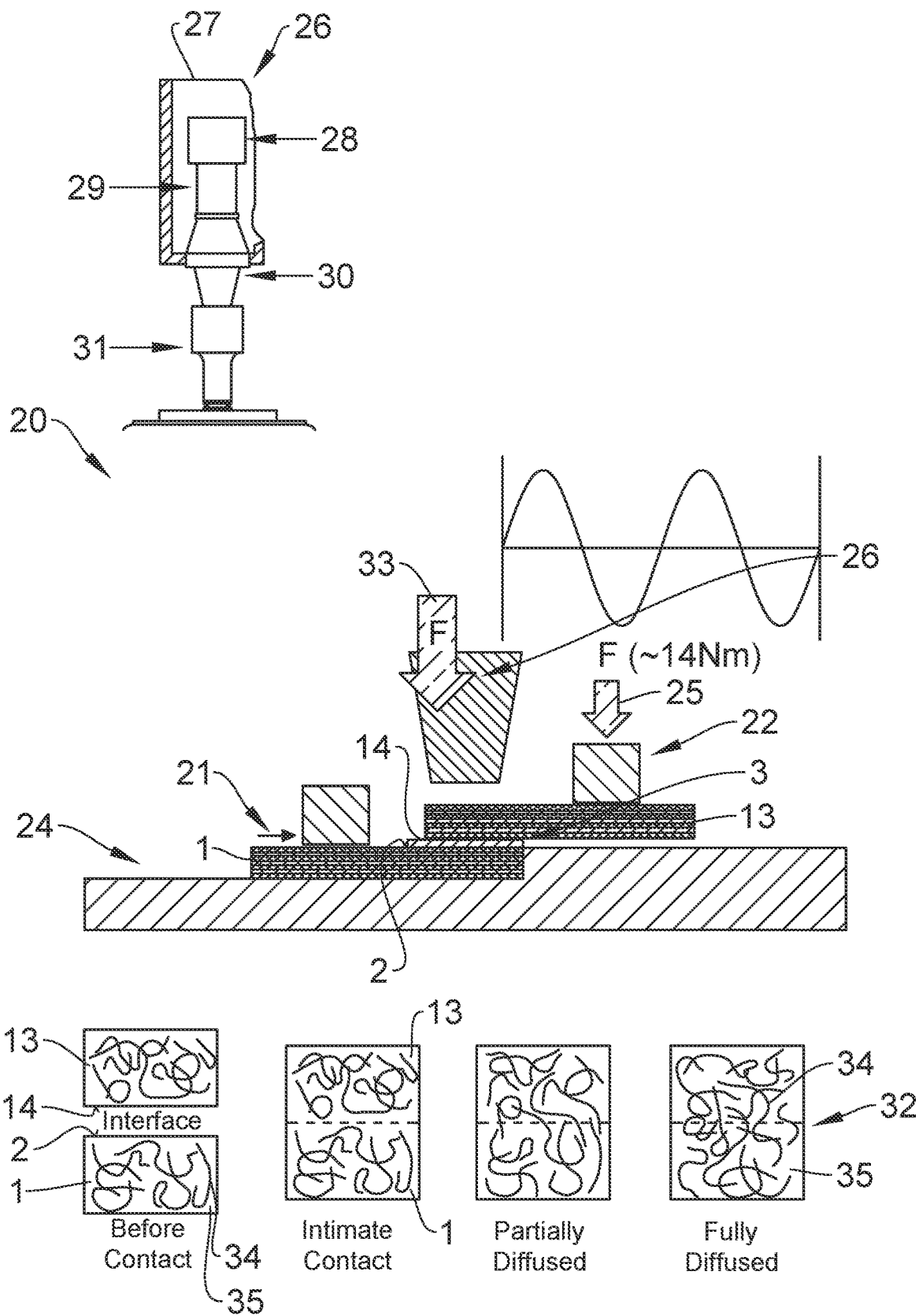
FIG. 7 illustrates apparatus for ultrasonic welding.

FIG. 7 illustrates a schematic view of apparatus 20 for ultrasonic welding the components 1, 13. In order to weld the first and second components 1, 13 to one another, a source of energy is used. The components 1, 13 to be joined may also be called adherents. The structured filler sheet 3 is positioned at the interface 23 between the components 1 and 12 at a position in which the components 1, 13 are to be joined. The first and second components 1, 13 may be held in place by clamps 21, 22 on an anvil 24 and mechanical pressure applied as is indicated by the arrow 25. The remainder of the first surface 2 of the first component 1 and the joining surface 14 of the second component 13 remain uncovered by the structured filler sheet 3.

The structured surface 10 of the filler sheet 3 has a surface profile which has a plurality of protrusions 11 spaced apart by indentations 12. The protrusions 11 and/or indentations 12 may be arranged regularly or irregularly. The surface 14 of the component 13 is in direct contact with the protrusions 11 of the filler sheet 3. The protrusions 11 act as energy directors and are used to direct the ultrasonic energy from the sonotrode 26 into the contact area between the first surface 2 of the first component and the first surface 14 of the second component 13. The protrusions 11 act as a plurality of distributed ultrasonic sources and provide a more regular dissipation of the ultrasonic energy over the area of the joint between the components 1, 13.

An example sonotrode is illustrated in FIG. 7. The sonotrode 26 comprises a pneumatic press 27, frequency converter 28, the piezoelectric converter 29, booster 30 and the sonotrode tip 31. The sonotrode 26 is brought into contact with one of the components to be welded, in the embodiment illustrated in FIG. 7, with the component 13. The sonotrode 26 exerts static pressure, as is indicated schematically in FIG. 7 by the arrow 33, and high frequency (20 kHz) low amplitude (10 μm to 50 μm) transverse mechanical vibration on the components 1, 13. Heat is generated by a combination of fiction and viscoelastic heating. Melting of the energy director, i.e., the protrusions 11 of the filler sheet 3 is caused by higher cycling's strain due to lower stiffness of the energy direct vector compared to the fiber reinforced components 1, 13. Ultrasonic energy is inserted into the component 13, the filler sheet 3 and the component 1, whereby the protrusions 11 in the filler sheet 3 act as energy directors and distribute the ultrasonic energy so that the thermoplastic material of the filler sheet 3 and of the components 1, 13 in the region of the interface between the components 1, 13 melts.

Therefore, not only the remainder of the filler sheet 3 with its structured surface 10 but also the regions of the components 1 and 13 in the immediate facility of the contacting interface melt allowing fusion of the materials of the first and second components 1, 13, i.e., the fibers 34 and thermoplastic matrix 35, as illustrated schematically in FIG. 7. Thus, after removal of the ultrasonic energy, the thermoplastic material cools and solidifies creating the welded joint 32 between the components 1, 13.

Figure 8:
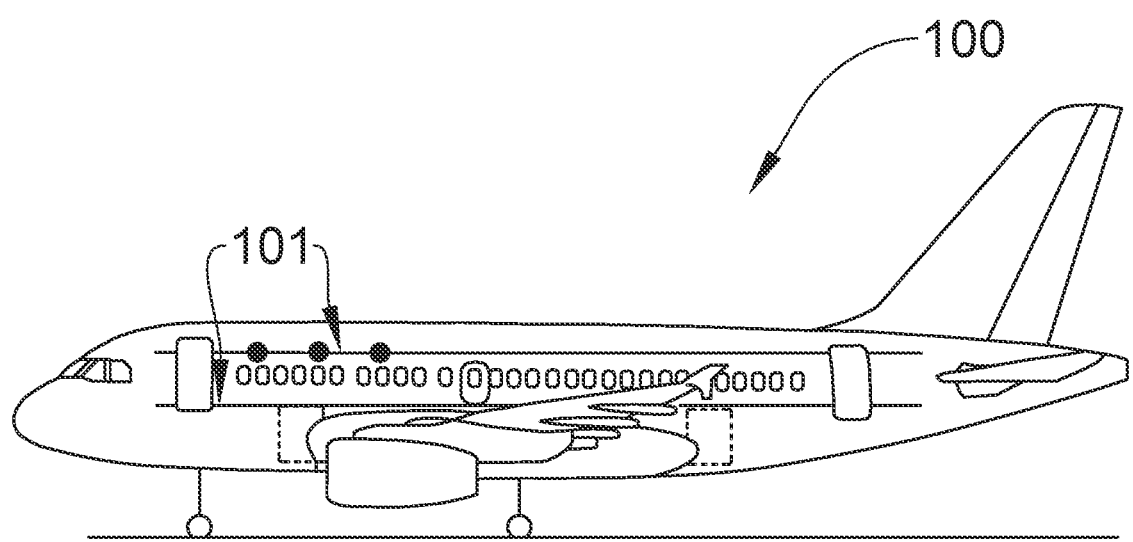
FIG. 8 illustrates an aircraft.

In an embodiment, the components 1, 13 are a part of an aircraft 100, as illustrated in FIG. 8. The welded assembly may be used as part of fuselage 101 for example. In some embodiments, one or both of the components 1, 13 may be a stiffening or strengthening component such as a stringer 101, shell or clip.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

1 component
2 first surface
3 filler sheet
4 structuring part
5 joining area
6 arrow
7 plate
8 heat source
9 arrow
10 outer surface
11 protrusion
12 indentation
13 component
14 surface
15 filament
16 arrow
20 apparatus
21 clamp
22 clamp
24 anvil
25 arrow
26 sonotrode
27 pneumatic press
28 frequency converter
29 piezoelectric converter
30 booster
31 sonotrode tip
32 welded joint
33 arrow
34 fiber
35 thermoplastic matrix
100 aircraft
101 stringer

The invention claimed is:

1. A method for producing a component with a surface that is suitable for joining of two and more parts, the method comprising:
providing a first component comprising a first surface;
arranging a filler sheet comprising a thermoplastic material on the first surface;
arranging a structuring tool on the filler sheet;
applying mechanical force to the structuring tool to provide a compressive force between the structuring tool and the first surface and applying heat to the filler sheet such that due to the compressive force, the tool is urged into the filler sheet and becomes partially embedded in the filler sheet as the thermoplastic material of the filler sheet melts and such that the filler sheet is attached to the first surface of the first component;
removing the structuring tool from the filler sheet and producing in the filler sheet an outer surface comprising a plurality of protrusions.

2. The method according to claim 1, further comprising:
arranging a second component on the plurality of protrusions, and
joining the first and second components by joining to form an assembly.

3. The method according to claim 2, wherein the first and second components are joined using ultrasonic welding, or infrared welding, or induction welding, or laser beam welding, or conductive welding and co-consolidation, or adhesive bonding.

4. The method according to claim 1, wherein the thermoplastic material of the filler sheet comprises at least one of the group consisting of LM PAEK, PEKK, PEEK, PEI, PA, PPS, PB, PBC, PV and PC.

5. The method according to claim 1, wherein the filler sheet comprises an adhesive material.

6. The method according to claim 1, wherein at least one of the first component or second component comprises a reinforced or unreinforced plastic or metallic material.

7. The method according to claim 6, wherein the at least one of the first component or second component comprises a reinforced or unreinforced plastic or metallic material, whereby the plastic or metallic material forms a matrix.

8. The method according to claim 6, wherein the at least one of the first component or second component comprises a thermoplastic material comprising at least one of the group consisting of LM PAEK, PEKK, PEEK, PEI, PA, PPS, PB, PBC, PV and PC.

9. The method according to claim 8, wherein the filler sheet comprises the same thermoplastic material as the at least one of the first component or second component.

10. The method according to claim 1, wherein the at least one of the first component or the second component comprises a thermosetting material or is formed of a metal or is formed of an alloy or is formed of a laminated material comprising metallic and non-metallic layers.

11. The method according to claim 1, wherein the filler sheet and structuring tool are applied locally to a joining area of the first surface of the first component.

12. The method according to claim 11, wherein the heat is applied locally to the joining area of the first surface of the first component.

13. The method according to claim 1, wherein the protrusions have dimensions substantially parallel or substantially perpendicular to the first surface that are less than 2 mm.

14. The method according to claim 1, wherein heat is applied to the filler sheet by at least one of infrared heating, a halogen lamp, conductive heating, induction heating or laser heating.

15. The method according to claim 1, wherein the structuring tool comprises a metallic part.

16. The method according to claim 1, wherein the structuring tool comprises a metallic mesh or a metallic textile.

17. The method according to claim 1, wherein the structuring tool comprises a glass-fiber textile.

18. The method according to claim 1, wherein the structuring tool comprises a ceramic fiber textile.

19. The method according to claim 1, wherein the at least one of the first component or the second component are structural parts of an aircraft, drone or a helicopter or a rocket, or a satellite or an automotive vehicle.

* * * * *